United States Patent [19]

Kasahara et al.

[11] Patent Number: 4,713,788
[45] Date of Patent: Dec. 15, 1987

[54] BURST SIGNAL GENERATOR

[75] Inventors: Toshiharu Kasahara, Okegawa; Takayuki Ogami; Hitoshi Kitayoshi, both of Gyoda, all of Japan

[73] Assignee: Takeda Riken Kogyo Kabushikikaisha, Tokyo, Japan

[21] Appl. No.: 644,961

[22] Filed: Aug. 28, 1984

[30] Foreign Application Priority Data

Sep. 8, 1983 [JP] Japan .................................. 58-165768
Sep. 20, 1983 [JP] Japan .................................. 58-173755

[51] Int. Cl.⁴ .......................... G06F 1/02; G10H 1/00
[52] U.S. Cl. .................................... 364/718; 364/721; 84/1.01
[58] Field of Search ............................... 364/718–722; 84/1.01

[56] References Cited

U.S. PATENT DOCUMENTS

| | | | |
|---|---|---|---|
| 3,633,017 | 1/1972 | Crooke et al. | 364/721 |
| 3,633,178 | 1/1972 | Zopf | 364/900 |
| 3,657,657 | 4/1972 | Jefferson | 364/721 |
| 3,831,015 | 8/1974 | Hoff, Jr. | 364/718 |
| 4,114,189 | 9/1978 | Davis | 364/718 |
| 4,164,020 | 8/1979 | Griffith | 364/718 |
| 4,267,579 | 5/1981 | Gross | 364/718 |
| 4,338,674 | 7/1982 | Hamada | 364/718 |
| 4,342,245 | 8/1982 | Gross | 364/718 |
| 4,346,448 | 8/1982 | Insam et al. | 364/721 |

OTHER PUBLICATIONS

ELEKTOR, vol. 5, No. 7/8, Jul./Aug. 1979, pp. 7-75, Canterbury, GB; C. Rohrbacher: "Programmable Digital Function Generator".
Siemens Review, vol. 45, No. 10, Oct. 1978, pp. 464-467, Erlangen, DE; J. L. Pfeffer: "Computer-controlled Waveshape Generator for Programmable Waveshapes".

Primary Examiner—David H. Malzahn
Assistant Examiner—Long Thanh Nguyen
Attorney, Agent, or Firm—Staas & Halsey

[57] ABSTRACT

A set value of a frequency setting register is accumulated upon each occurrence of a clock signal, and a waveform memory is read out by using the accumulated value as an address. In the waveform memory, amplitude data of one cycle of the waveform of a burst signal to be generated are stored at fixed phase intervals. The output read out of the waveform memory is converted into an analog signal. A wave-number counter counts the number of times the amplitude data of one cycle is read out of the waveform memory and, when having counted by a preset number of waves, yields a wave-number counting end signal. After the occurrence of the wave-number counting end signal, a phase counter counts clock signals, and, when the count value of the phase counter reaches a value corresponding to a preset end phase, the generation of the burst signal is stopped.

16 Claims, 10 Drawing Figures

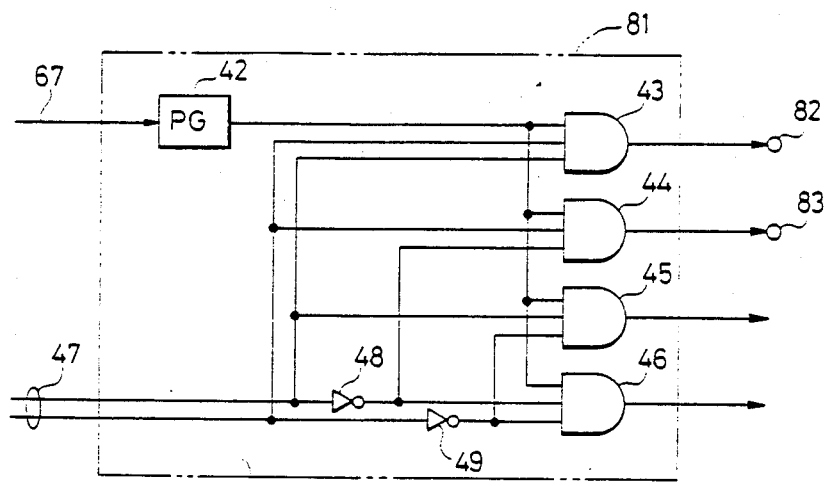

BURST SIGNAL GENERATOR

BACKGROUND OF THE INVENTION

The present invention relates to a burst signal generator which is used for supplying a so-called burst signal of a certain period to a device under test, for example, for analyzing its frequency characteristics by a digital spectrum analyzer.

A conventional burst signal generator is designed so that an oscillator of a constant frequency is switched ON and OFF by a FET or like switching means and the oscillator output is supplied to, for example, a device under test during the ON period alone, or the oscillator output is amplitude modulated 100% by a rectangular wave signal of a fixed frequency, that is, intermittently modulated, thereby obtaining a burst signal as the modulated output.

With such a prior art burst signal generator, however, it is difficult to accurately obtain a preset number of waves during the period of the burst signal. Heretofore there has not been proposed such an arrangement that start and end phases of the burst signal are preset so that the burst signal starts and ends with the preset start and end phases, relatively. For example, in the case of measuring the time response of an automatic control system, or in measuring the response of a device when it is mechanically or electrically vibrated, the response characteristic sometimes considerably differs with the value of the end phase of the applied mechanical or electrical burst signal. In such a case, it is desired to produce a burst signal which stops with a preset end phase (stop phase). Further, it is sometimes desired to measure a response to the application of two consecutive burst signals. For producing the two burst signals in succession, it is necessary to set the start phase of the succeeding burst signal in such a manner as to immediately follow the end phases of the preceding burst signal. In the past, however, there has not been proposed an arrangement which produces a burst signal with a start phase of such a preset value.

In Japanese Patent Application No. 167370/82 (U.S. patent application Ser. No. 533,780 filed on Sept. 19, 1983) which had not been published before the filing of the basic Japanese patent application of this application, it is disclosed to prestore waveform data (amplitude values) of a signal of one cycle in a waveform memory at fixed phase intervals, to read out the waveform memory at a constant rate and to convert the read-out waveform data into an analog signal. Further, it is disclosed to raise the frequency of the output signal by reading out the waveform memory while skipping over a fixed number of addresses for every readout clock and to reduce the frequency of the output signal by reading out the waveform memory at one address for every plurality of readout clocks. This prior application, however, does not describe to read out the waveform memory by a preset number of waves and to start and stop the generation of the output signal with preset phases, respectively.

SUMMARY OF THE INVENTION

It is therefore an object of the present invention to provide a burst signal generator which permits the generation of a burst signal of a preset number of waves.

Another object of the present invention is to provide a burst signal generator which is capable of stopping the generated burst signal with a preset end phase.

Yet another object of the present invention is to provide a burst signal generator which is capable of starting a burst signal with a preset phase.

According to the present invention, a waveform memory has prestored therein waveform data of one cycle at constant phase intervals. Upon each occurrence of a clock signal from a clock signal source, a value set in frequency setting means is accumulated by accumulating means, and the accumulated value is used as an address for reading out the waveform memory. The waveform data read out of the waveform memory is converted by a D/A converter into an analog form for output as a burst signal. A wave-number counting means counts each time the waveform data of one cycle is read out of the waveform memory, and when its count value reaches a set value of a wave-number setting means, the burst signal generating operation is stopped.

When end phase setting means is provided, even if the count value of the wave-number counting means reaches the set value, the burst signal generating operation is not suspended, but is continued and clock signals are counted by phase counting means. When the count value of the phase counting means reaches a value corresponding to a preset end phase, the burst signal generating operation is stopped.

Further, when start phase setting means is provided, a value corresponding to a preset start phase is added to the accumulated value of the abovementioned accumulating means, and the added value is used to read out the waveform memory.

BRIEF DESCRIPTION OF THE DRAWINGS

FIG. 1B is a diagram schematically showing a modified form of the pulse generating means in FIG. 1A;

FIG. 2 is a diagram partly showing an example of stored contents of a RAM 64;

DESCRIPTION OF THE PREFERRED EMBODIMENTS

Figure 1A:
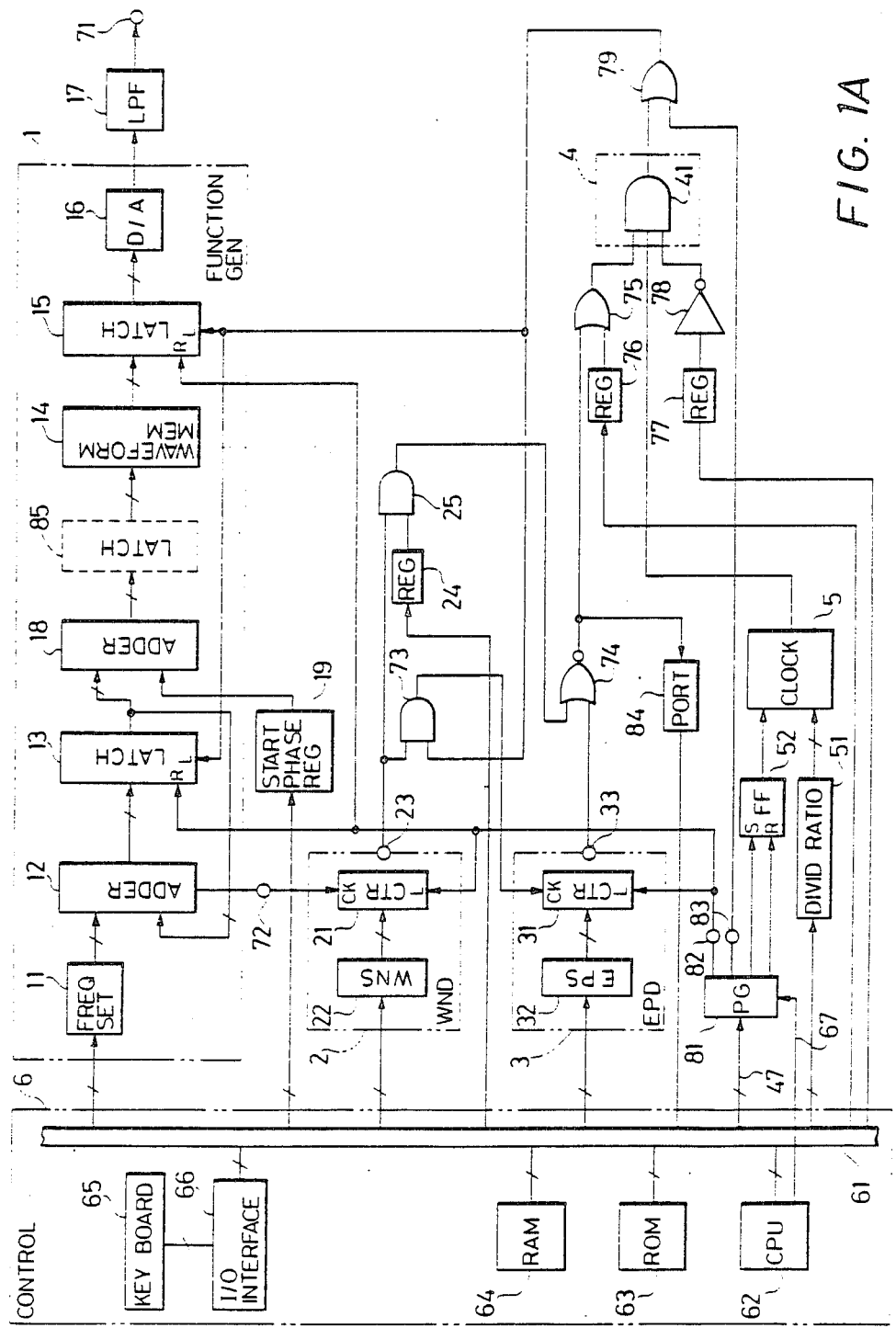
FIG. 1A is a block diagram illustrating an embodiment of the burst signal generator of the present invention.

FIG. 1A illustrates an embodiment of the burst signal generator of the present invention. The burst signal generator is comprised principally of a phase accumulating type function generating means 1, a wave-number detecting means 2 for detecting that the number of waves of a function waveform generated by the phase accumulating type function generating means 1 reaches a preset value, an end phase detecting means 3 for detecting that the generated waveform comes to have a preset end phase, a signal generator suspending means 4 for suspending a signal generation, a clock signal source 5 for generating an operation clock signal and a controller 6 for controlling the entire system.

A value corresponding to the frequency of a burst signal that is desired to be obtained is set in a frequency setting register 11 of the phase accumulating type function generating means 1. The set value is added, by a cumulative adder 12, to phase data in a latch circuit 13, thusly obtaining new phase data. The phase data thus obtained by the adder 12 is latched, by a clock signal, in the latch circuit 13. Accordingly, the value set in the frequency setting register 11 is accumulated in the adder 12 upon each occurrence of the clock signal.

The phase data latched in the latch circuit 13 is added, by an adder 18, to a value corresponding to a start phase set in a start phase setting register 19, thusly obtaining phase data for memory readout use. This phase data is used as an address to read out a waveform memory 14. In the waveform memory 14 there are prestored, in a sequential order, waveform amplitude data, for example, amplitude values of a sine wave of one cycle, at fixed phase intervals. The adder 18 provides to the waveform memory 14 phase data having a bit-length equal to the bit-length of the maximum phase data value to be used as the maximum address for access to the waveform memory 14. For example, when the number of waveform data stored in the waveform memory 14 is $2^n$, n-bit phase data (addresses) are provided to the adder 18 which is of an n-bit length. The cumulative adder 12 is also of an n-bit length, and the n-bit phase data of the adder 12 is latched in the latch circuit 13. Also in the start phase setting register 19 is set the start phase as n-bit data.

The waveform data (the amplitude data) read out of the waveform memory 14 is latched in a latch circuit 15 upon each occurrence of the clock signal. The latched waveform data is converted by a D/A converter 16 into an analog signal, which is provided to a burst signal output terminal 71 after being applied to a low-pass filter 17, as required.

The wave-number detecting means 2 comprises a wave-number counter 21 and a wave-number setting register 22, and detects when the number of cycles (the number of waves) in the burst signal derived at the output terminal 71 reaches a preset value. To this end, each time the accumulated value in the adder 12 exceeds a maximum address value $2^n$ of the waveform memory 14, a carry signal is delivered at a terminal 72, and such carry signals are counted by the wave-number counter 21. When a presettable up counter is used as the wave-number counter 21, a complement of the number of waves to be generated, with respect to a maximum count value of the wave-number counter 21, is set in the wave-number setting register 22. At the start of operation, the complement is preset in the wave-number counter 21, and the carry signals from the terminal 72 are counted up by the wave-number counter 21. A wave-number counting end signal is yielded at a terminal 23 when bits of the counter 21 go to all "1" as a result of the above up-counting. It is also possible to employ a presettable down counter as the wave-number counter 21. In such a case, the number of waves to be generated is set in the wave-number setting register 22, and at the start of operation, it is preset in the wave-number counter 21. The wave-number counting end signal is produced upon detecting that the bits of the counter 21 have come to all "0" as a result of the down-counting of the carry signals. Further, an ordinary up counter can be used as the wave-number counter 21, in which case, at the start of operation, the counter 21 is reset to zero and is caused to count up the carry signals. The count value of the wave-number counter 21 and the number of waves set in the wave-number setting register 22 are compared by a digital comparator, and, when coincidence is detected, the wave-number counting end signal is produced.

The end phase detecting means 3 yields a stop signal upon detecting the moment when the phase read out of the waveform memory 14 has reached the preset end phase after the waveform memory 14 was repeatedly read out by the preset number of waves, that is, after the wave-number counting end signal was delivered from the wave-number detecting means 2. The end phase detecting means 3 comprises a phase counter 31 and an end phase setting register 32. In this embodiment, an AND gate 73 is opened by the wave-number counting end signal from the terminal 23, and clock signals having passed through the gate 73 are counted by the phase counter 31. In the end phase setting register 32 is set a value corresponding to the phase at which the burst signal derived at the terminal 71 is to be stopped. As is the case with the wave-number counter 21, a presettable up counter, a presettable down counter and an ordinary up counter can be used as the phase counter 31, and the value that is set in the end phase setting register 32 also changes according to the type of the counter used. Further, when the value set in the frequency setting register 11 is altered, the value of the end phase setting register 32 is also changed correspondingly, even if the end phase of the burst signal to be generated is identical with that before the alteration of the set frequency.

For example, in the case where a presettable down counter is employed as the phase counter 31 and the frequency setting register 11 is set to "00 . . . 01" ("1" in decimal) so that the waveform memory 14 is read out at one address upon each occurrence of the clock signal, data on the phase at which to suspend the generation of the burst signal (i.e. any one of the addresses of the waveform memory 14) is set in the end phase setting register 32, and this set value of the end phase setting register 32 is preset in the phase counter 31 at the start of operation. Upon generation of the wave-number counting end signal, the phase counter 31 counts down the clock signals, and provides a stop signal to the terminal 33 when the bits of the phase counter 31 go to all "0". In the above example, "1" is preset in the setting register 11 so that the readout address of the waveform memory 14 advances one by one upon each occurrence of the clock signal. On the other hand, in the case where a value "k", instead of "1", is set in the setting register 11, the value that is to be set in the end phase setting register 32 is 1/k times the data on the phase at which to suspend the generation of the burst signal.

The signal generation suspending means 4 is formed by an AND circuit 41 and stops the clock signal supply to the phase accumulating type function generating means 1 and the gate 73. The clock signal from the clock signal source 5 is applied to the AND circuit 41, to which the stop signal at the terminal 33 is provided via a NOR gate 74 and an OR gate 75. Further, the embodiment shown in FIG. 1A is arranged to have such optional functions that a continuation command is applied from a continuation command register 76 to the OR gate 75 to thereby generate at the terminal 71 a continuous waveform regardless of the preset wave-number and the preset end phase, and also a temporary stop command is provided from a temporary stop command register 77 to the AND circuit 41 via an inverter 78 to thereby stop generation of the burst signal at a desired time. Further, in this embodiment, there are provided a phase detection inhibit command register 24 which is connected to the bus 61 and an AND gate 25 which is connected at the input thereof to the output of the phase detection inhibit command register 24 and to the output terminal 23 of the wave-number detecting means 2, and at the output thereof to the input of the NOR gate 74. By presetting a phase detection inhibit command signal in the inhibit command register 24, the generation of the burst signal can be stopped immediately after the counting of the preset number of waves (i.e. at the 0° or 360° phase), regardless of the preset end phase $\theta_e$. The clock signal applied to the AND circuit 41 is applied therefrom via an OR gate 79 to latch command terminals L of the latch circuits 13 and 15, and at the same time, it is supplied to the AND gate 73. The clock signal source 5 has incorporated therein a clock generator for generating a reference clock and a variable frequency divider for frequency dividing the reference clock. The frequency divided output is delivered as the clock signal. The frequency dividing ratio of the variable frequency divider is determined by a value set in a frequency dividing ratio setting register 51. A gate in the clock signal source 5 is placed under the control of a start-stop circuit 52 formed by a set-reset type flip-flop so as to control the delivery of the clock signal from the clock signal source 5.

The controller 6 is shown to be constituted by what is called a microcomputer. To its data bus 61 are connected a CPU 62, a ROM 63 and a RAM 64, and a keyboard 65 is connected via an interface 66. A display is also connected to the data bus 61, though not shown. Moreover, the frequency setting register 11, the start phase setting register 19, the wave-number set register 22, the end phase detection inhibit register 24, the end phase setting register 32, the frequency dividing ratio setting register 51, the continuation command register 76, and the temporary stop command register 77 are connected to the data bus 61. A pulse generator 81 is connected to the data bus 61. In response to the input data thereto, the pulse generator 81 yields a reset pulse at a terminal 82 or a phase initialization pulse at a terminal 83, or provides a start or stop pulse to the start-stop circuit 52.

The above-mentioned pulse generating means 81 can be arranged, for example, as shown in FIG. 1B. A pulse generator 42, such as, for instance, a monostable multivibrator, is provided which is connected via a control line 67 to the CPU 62 and produces a pulse of a fixed width at the timing commanded from the CPU 62 and whose output is connected to one input of each of AND gates 43, 44, 45 and 46. Inverters 48 and 49 are respectively connected to two select lines 47 connected to the data bus 61, their inputs being connected to another input of the AND gates 43, 45 and 43, 44 and their outputs being connected to another input of the AND gates 44, 46 and 45, 46. Accordingly, by providing two-bit select data on the select lines 47 and applying a command from the CPU 62 via the control line 67 to the pulse generator 42 at required timing, a pulse of a predetermined width can be obtained, at that timing, at the output of a desired one of the AND gates 43, 44, 45 and 46 which is specified by the select data. It is also possible, of course, to apply command pulses directly to the terminals 82 and 83 and the flip-flop 52 from the CPU 62 without providing such pulse generating means.

The timing for generating the above pulses is provided from the CPU 62 via the control line 67. The output state of the end phase detecting means 3, for example, the output of the NOR gate 74, can be input into the CPU 62 via an input port 84. Incidentally, an address bus and a control bus are provided in the controller 6, though not shown, and any one of the various setting registers and so forth is selected by an address provided on the address bus so that the content provided on the data bus 61 can be set, for instance, in the selected setting register in response to a control command given via the control bus.

Figure 3:
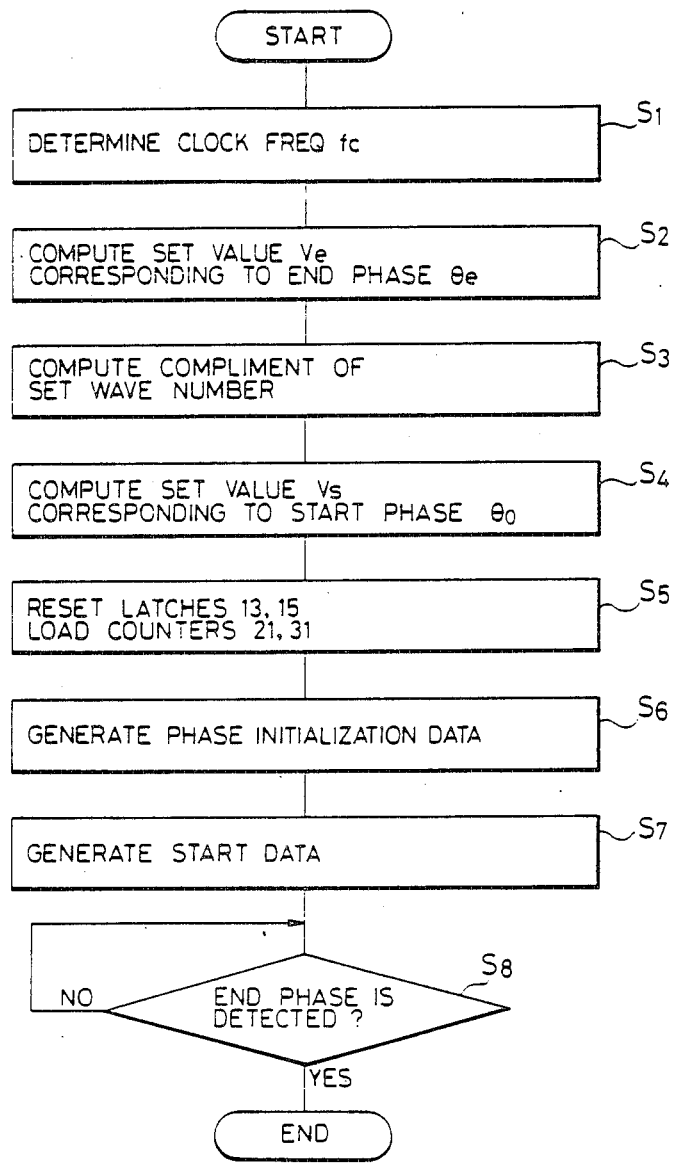
FIG. 3 is a flowchart showing an example of an operation in a controller 6 in FIG. 1A.

By sequentially reading out, interpreting and executing programs stored in the ROM 63, the CPU 62 performs the following operation which will be described with reference to a flowchart of FIG. 3. In the case of using this invention apparatus, the frequency $F_i$ of the burst signal to be generated, its start phase $\theta_0$, the number of waves to be generated N, and its end phase $\theta_e$ are entered from the keyboard 65, and these data are stored in the RAM 64 in such a manner as shown in FIG. 2.

The burst signal generator of the present invention may sometimes be used with, for example, what is called a digital spectrum analyzer in which the burst signal generated by the burst signal generator is applied to a device under test and its output is subjected to fast Fourier transformation, thereby measuring its characteristics. With the fast Fourier transformation, since the measurement results are obtained in connection with a frequency increment component for every frequency $\Delta F$, the frequency of the burst signal to be generated needs only to be an integral multiple of the frequency increment $\Delta F$. In the digital spectrum analyzer, for instance, a maximum value $F_m$ (for example, 500 Hz) of the frequency of the band being measured is displayed, as M (for example, 401) spectra for every $\Delta F$, on a display screen, and the spectra 0, $\Delta F$, $2\Delta F$, $3\Delta F$, . . . are respectively assigned line numbers 0, 1, 2, 3, . . . . The frequency, which is to be generated by the burst signal generator corresponding to the spectra, is referred to be a line number $L_i$. That is, the number $L_i$ is entered in place of the frequency $F_i$ and is stored in the RAM 64. The maximum frequency $F_m$ and the number of display lines (i.e. spectrum lines) M are entered from the keyboard 65. In step $S_1$, based on these data and the number of data, $2^n$, of the waveform memory 14, the clock signal frequency $f_c$ is calculated as follows:

$$f_c = 2^n \frac{F_m}{M} = 2^n \times \Delta F \tag{1}$$

The frequency dividing ratio is set in the frequency dividing ratio setting register 51 so that a clock signal of the frequency $f_c$ is obtained as the output of the clock signal source 5.

Next, in step $S_2$, a value to be set in the end phase setting register 32 is calculated from the set line number $L_i$ corresponding to the set frequency $F_i$, and the set end phase $\theta_e$. As will be seen from Eq. (1), the clock frequency $f_c$ is determined on the basis that when a burst signal of the lowest frequency $F_1=\Delta F$ is to be generated, the address for accessing the waveform memory 14 is incremented one by one upon each occurrence of the clock signal to read out all of the $2^n$ data of one cycle. Accordingly, when the line number is i ($L_i$), the i is set in the frequency setting register 11 and is accumulated, so that the waveform memory 14 is read out at every ith address for each clock signal. Thus, the number of data which are read out of the waveform memory 14 in one cycle is $2^n/i$, and the readout phase data advances by steps of $360°/(2^n/i)$ upon each occurrence of the clock signal. A set end phase $\theta_e$ is divided by this value to obtain the following set value $V_e$:

$$V_e = \frac{\theta_e}{\frac{360°}{(2^n/i)}} \tag{2}$$

and the value $V_e$ is set in the setting register 32. In the case of using a presettable up counter as the wave-number 21, a complement of the set number of waves, N, with respect to a maximum count value of the counter 21 is calculated in step $S_3$, and it is set in the wave-number setting register 22. In step $S_4$, $V_s=\theta_0 \times 2^n/360$ is calculated and the calculation result is set in the start phase setting register 19. In the frequency setting register 11 is set the line number i.

In step $S_5$, select data "11", i.e. reset data is provided via the select lines 47 to the pulse generator 81 to yield a reset pulse at the terminal 82, by which the contents of the latch circuits 13 and 15 are reset to zero. At the same time, the content of the wave-number setting register 22 is preset in the wave-number counter 21 and the content of the end phase setting register 32 is preset in the phase counter 31. In the next step $S_6$, select data "10", i.e. phase initialization data is provided to the pulse generator 81 to derive a phase initializing pulse at the terminal 83, which pulse is applied as a latch command to the latch circuits 13 and 15 via the OR gate 79. Before the generation of the latch command the contents of the latch circuits 13 and 15 are both zero, the adder 12 outputs a value i which the sum of the content i of the frequency setting register 11 and zero, and the adder 18 outputs a value which is the sum of the content of the start phase setting register 19 and zero, which output is applied as a phase data, i.e. an address to the waveform memory 14 to read out therefrom waveform data of the corresponding address. Accordingly, by the application of the latch command, the accumulation result i of the adder 12 is latched in the latch circuit 13 and waveform data corresponding to the set start phase is latched in the latch circuit 15. In other words, the waveform data of the set start phase is converted into an analog signal and provided at the output terminal 71.

Upon application of select data "01", i.e. start data to the pulse generator 81 in step $S_7$, the start-stop circuit 52 is set in its start state, generating a clock signal from the clock signal source 5. At this time, the output terminal 33 of the end phase detecting means 3 is low-level, the output of the OR gate 75 is high-level, the output of the temporary stop command register 77 is low-level and the output of the inverter 78 is high-level. Accordingly, the clock signal passes through the gate circuit 41 and is applied via the OR gate 79 to the latch circuits 13 and 15. Upon each application of the clock signal to the latch circuits 13 and 15, the accumulated value in the adder 12 is latched in the latch circuit 13, and the waveform data which is read out of the waveform memory 14 by phase data obtained by adding the content of the latch circuit 13 before the abovesaid latching and the content of the start phase setting register 19, is latched in the latch circuit 15. Consequently, upon each occurrence of the clock signal, waveform data is read out of the waveform memory 14 at a respective one of its addresses for every set value i of the frequency setting register 11, starting with an address corresponding to the start phase being set.

For example, assume that the number of bits of the adder 18 is 14, the number of addresses of the waveform memory 14 is $2^{14}=16,384$ (where n=14) and the waveform memory 14 stores respective amplitude values at 16,384 phase points into which one cycle, i.e. 360 degrees, of a sine wave is divided. That is to say, there are stored in the waveform memory 14 amplitude data of a zero phase value at an address 00,000 (expressed in decimal), amplitude data of a 1'19" phase value at an address 00,001, amplitude data of a 1°39" phase value at an address 00,046 and amplitude data of a 90°1'18" phase value at an address 04,097, respectively. In the case where a "1" is set in the frequency setting register 11 and the waveform memory 14 is read out, from address to address, by a clock signal of a frequency 16,384 Hz, amplitude data for every 1 minute and 19 seconds is read out by each clock signal, thus providing an analog signal of a sine wave having a 1 Hz frequency at the output terminal 71. When reading out the waveform memory 14 by a clock signal of a frequency 1,638.4 KHz, an analog signal of a frequency 100 Hz is delivered at the output terminal 71.

Now, let it be assumed that the frequency setting register 11 has set therein 100 Hz, that the clock signal frequency is 16,384 Hz and that the content of the start phase setting register 19 is zero. In this case, the latch 13 outputs first the phase data 00,000, which is added with 100 by the adder 12 and latched by the latch 13 upon occurrence of a phase initializing pulse, and the resulting phase data 00,100 is supplied as an address to the waveform memory 14. Thereafter, upon each occurrence of the clock signal, 100 is added to the phase data from the latch 13, and the waveform memory 14 delivers amplitude data for every 2 degrees, 11 minutes and 50 seconds, for thus obtaining an analog signal of a 100 Hz frequency at the output terminal 71. By setting 50 KHz in the frequency setting register 11, changing the frequency dividing ratio in the frequency dividing ratio setting register 51 to alter the clock signal frequency to 1,638.4 KHz and reading out of the waveform memory 14 amplitude data for every 4 degrees, 23 minutes and 40 seconds from the waveform memory 14, an analog signal of 50 KHz is obtained at the output terminal 71.

As described previously, each time its accumulation result exceeds the maximum address of the waveform memory 14, for example, 16,384, the adder 12 yields a carry signal. In other words, each time the signal derived at the output terminal 71 exceeds one cycle, the adder 12 produces a carry signal. Such carry signals are counted by the wave-number counter 21. When the carry signals are counted by the preset number of waves, N, each count stage of the wave-number counter 21 goes to a "1" and a wave-number counting end signal is provided at the terminal 23.

When the waveform memory 14 is repeatedly read out by the preset number of waves as described above, the wave-number counting end signal is generated to open the gate 73, through which clock signals are counted down by the phase counter 31. When the content of the phase counter 31 reaches all "0", a stop signal is provided at the terminal 33. In the end phase setting register 32 there is set a value obtained by dividing the preset end phase by the set value of the frequency setting register 11. Therefore, as the set frequency rises, the phase data which is read out of the waveform memory 14 upon each occurrence of the clock signal advances faster, and the preset end phase is reached with a corresponding smaller number of clock pulses.

Thus, when the number of waves of the burst signal reaches a preset value and the burst signal reaches the preset end phase immediately thereafter, a stop signal is yielded at the terminal 33, by which the outputs of the NOR gate 74 and the OR gate 75 are made low-level (the output of the continuation command register 76 remaining low-level). As a result of this, the gate circuit 41 is closed, from which no clock signal is output, and the generation of the burst signal is stopped. In step $S_8$, the controller 6 periodically fetches the output of the NOR gate 74 via the input port 84 and, when the fetched output is found to be low-level, the controller 6 detects the end of the generation of the burst signal, initiating the next operation, which may be repetition of the abovementioned successive steps $S_5$, $S_6$, $S_7$ and $S_8$ after a predetermined time interval given by an internal timer means provided in the controller 6 though not shown.

In FIG. 1A, it is also possible to connect a latch circuit 85 between the adder 18 and the waveform memory 14, as indicated by the broken line, so that the waveform memory 14 is read out in synchronism with the clock signal. Also it is possible to obtain a continuous wave of the preset frequency at the output terminal 71 by setting continuation command data in the continuation command register 76 from the CPU 62 to make the output of the register 76 high-level. Such a continuous signal generation can be temporarily stopped by setting temporary stop data in the temporary stop command register 77 to make its output high-level, closing the gate circuit 41. This "stop" state can be cleared by resetting the temporary stop command register 77 to zero. In the case where the start phase of the burst signal to be generated is always zero degrees, the start phase setting register 19 and the adder 18 are omitted and the waveform memory 14 is read out by the output of the latch circuit 13. In the event that the start phase setting register 19 and the adder 18 are provided, the phase of the burst signal being generated can be varied abruptly and arbitrarily by changing the set value of the start phase setting register 19 during the signal generation.

Figure 4:
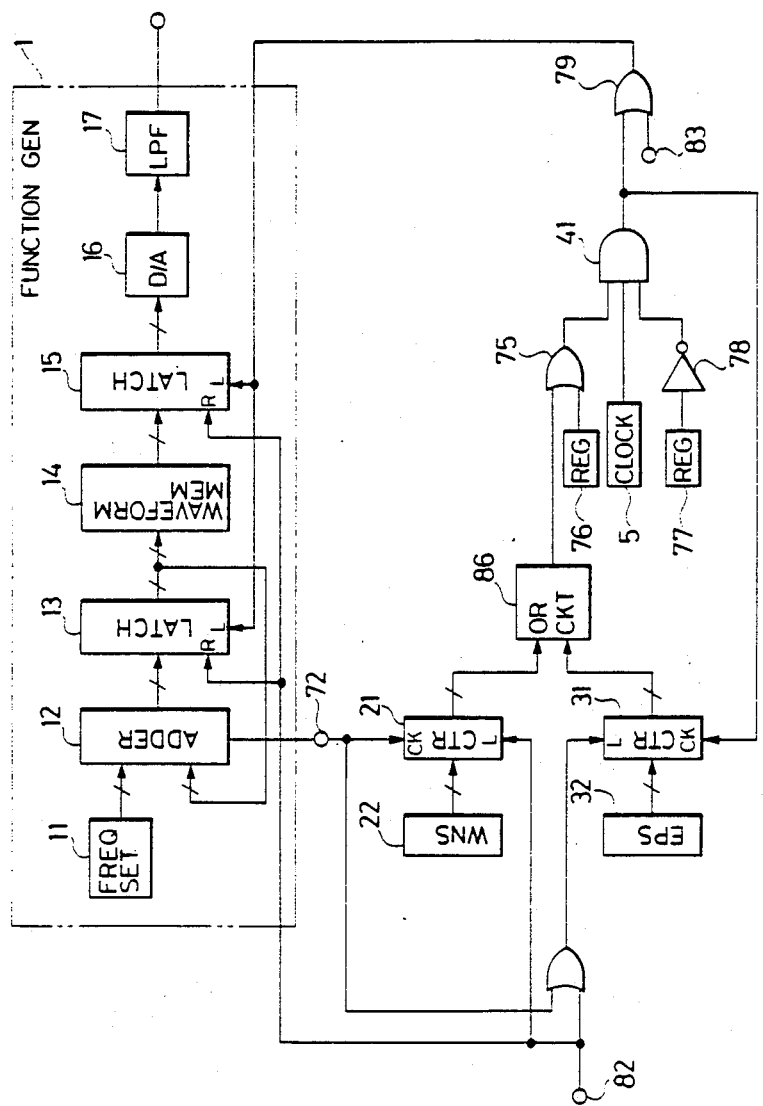
FIG. 4 is a block diagram partly illustrating another embodiment of the present invention which does not include start phase setting means.

FIG. 4 illustrates another embodiment of the present invention, in which the parts corresponding to those in FIG. 1A are identified by the same reference numerals. In FIG. 1A, the phase counter 31 is caused to start counting after the generation of the wave-number counting end signal. In the embodiment of FIG. 4, however, the phase counter 31 is always activated, but the stop signal is yielded only when the count value of the phase counter 31 has reached the set value of the setting register 32 after the wave-number counting end signal was produced. The wave-number 21 and the phase counter 31 are both formed by presettable down counters, and as in the case of FIG. 1A, the set values of the setting registers 22 and 32 are respectively preset, by the reset pulse at the terminal 82, in the counters 21 and 31, but the content of the setting register 32 is preset in the phase counter 31 upon each occurrence of the carry signal at the terminal 72. The phase counter 31 always counts down the clock signals from the gate circuit 41. The output of each count stage of the counters 21 and 31 is supplied to an OR circuit 86, the output of which is, in turn, provided to the OR gate 75. With such an arrangement, during the generation of the burst signal the bits of the phase counter go to all "0" once while the amplitude values of one cycle are read out of the waveform memory 14. Accordingly, the content of the phase counter 31 repeatedly go to all "0" until the content of the wave-number counter 21 goes to all "0", but the output of the OR circuit 86 remains high-level at all times. When the content of the phase counter 31 has come to all "0" after the content of the wave-number counter 21 reached the all "0" state, i.e. after the wave-number counting end signal was produced, the stop signal effectively operates to make the output of the OR circuit 86 low-level, closing the gate circuit 41 to put an end to the generation of the burst signal.

In FIG. 4, it is also possible to employ presettable up counters as the wave-number counter 21 and the phase counter 31 and to provide a circuit which provides a "0" to the OR gate 75 only when the contents of both counters 21 and 31 are all "1". In this case, the OR circuit 86 should be replaced by a NAND circuit. Similarly, it is also possible to use a presettable down counter as one of the counters 21 and 31 and a presettable up counter as the other.

Figure 5:
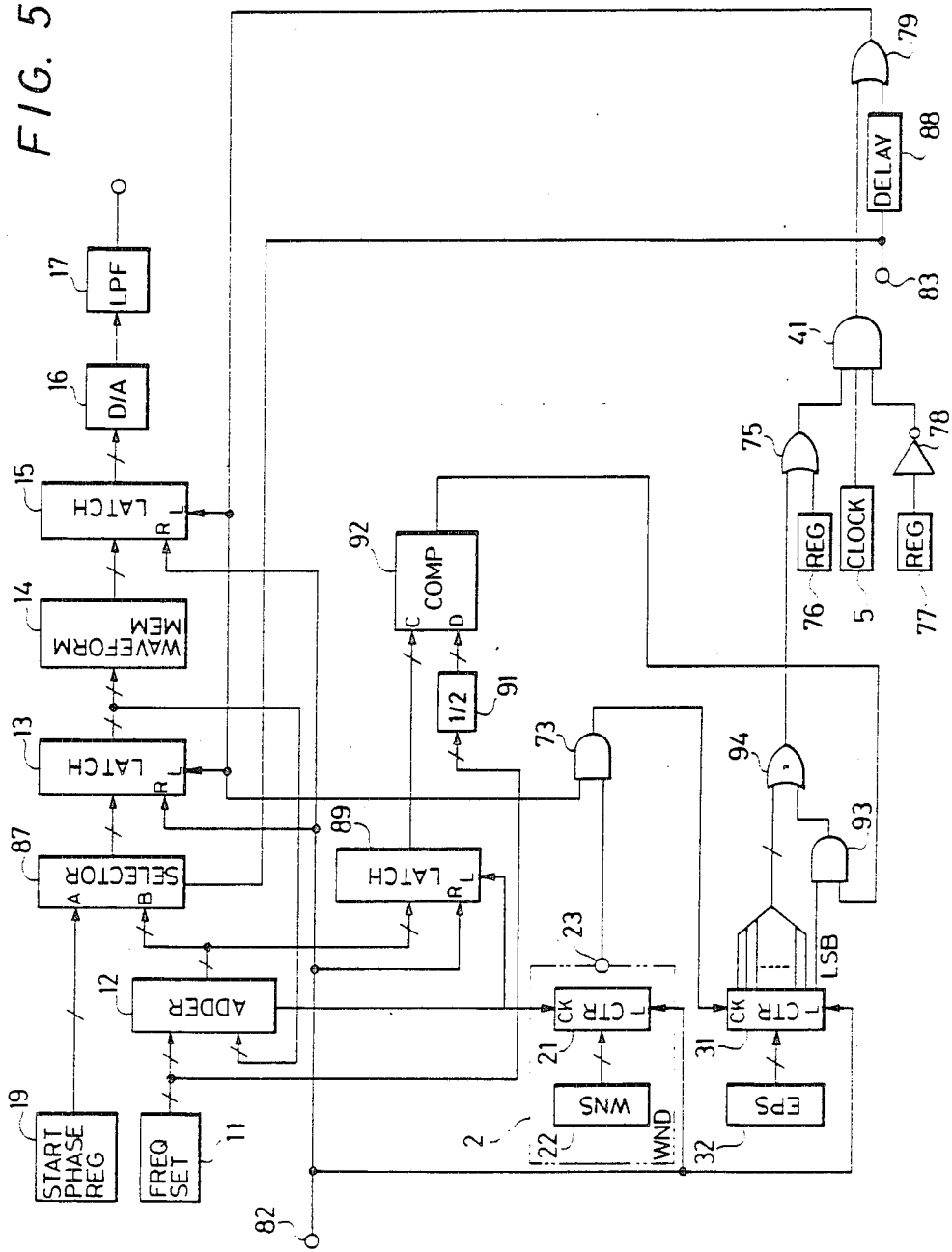
FIG. 5 is a block diagram partly illustrating another embodiment of the present invention which is provided with means for reducing an error in an end phase.

Any of the embodiments described above are designed so that the generation of the wave-number counting end signal is followed by the reading out of the waveform memory 14 by the number of times corresponding to the set end phase, thereby completing the generation of the burst signal. However, the wave-number counting end signal is not always produced when the phase of the read-out waveform is zero degrees (i.e. 360°). Accordingly, the phase data applied to the waveform memory 14 at the time of the wave-number counting end signal being yielded is an integer in the range of from 1 to $(i-1)$ where i is the value set in the frequency setting register 11. Therefore, when the phase data is $i-1$, the burst signal terminates with a phase ahead of $(i-1) \times 360/2^n$ degrees from the set end phase $\theta_e$. FIG. 5 illustrates another embodiment of the present invention which is designed to reduce a maximum value of this error by half. In this embodiment, a value corresponding to the start phase is set in the latch circuit 13 at first. That is, the output of the adder 12 and the content of the start phase setting register 19 are selected by a selector 87 for input into the latch circuit 13, the output of which is used to read out the waveform memory 14. The start phase set pulse is provided from the terminal 83 to the OR gate 79 via a delay circuit 88, and the pulse at the terminal 83 is applied to a select terminal of the selector 87. During the generation of the pulse at the terminal 83, the selector 87 selects the side of the start phase setting register 19, after which the output of the selector 87 is latched in the latch circuit 13 by the pulse from the terminal 83 delayed by the delay circuit 88. After the extinction of the pulse at the terminal 83, the selector 87 selects the side of the adder 12. In consequence, the set value of the frequency setting register 11 is cumulatively added to the set value of the start phase setting register 19.

The accumulation result by the adder 12 is latched, by the carry signal therefrom, in a latch circuit 89. On the other hand, the set value i of the frequency setting register 11 is supplied to a divider 91, also, and derived therefrom after the being divided down to ½. The divider 91 needs only to eliminate the least significant bit of the set value i and to shift each bit to the next-lower-order position. The adder 12 has an n-bit configuration relative to the number of data, $2^n$, of the waveform memory 14 and generates an overflow when the sum value exceeds n bits. The content C of the latch circuit 89 and the content D of the divider 91 are compared by a comparator 92, which yields a "1" or "0" depending upon whether C is smaller than D or not.

When a presettable down counter is used as the phase counter 31, its least significant bit output is supplied to an AND circuit 93 and the other bit outputs are applied to an OR gate 94. The output of the comparator 92 is also provided to the AND circuit 93, the output of which is applied to the OR gate 94, the output of which is, in turn, provided to the OR gate 75.

Accordingly, when the output of the latch circuit 89 at the time of generating the wave-number counting end signal, that is, the phase data provided to the waveform memory 14, is smaller than one-half the set value i of the frequency setting register 11, the comparator 92 produces an output "1". In consequence, only when the bits of the phase counter 31 go to all "0", does the OR gate 94 produce a "0" to stop the generation of the burst signal. On the other hand, in the case where the output of the latch circuit 89 at the time of generation of the wave-number counting end signal is equal to or greater than one-half the set value i, that is, when the phase of the above output leads zero degrees by a phase angle greater than i/2, the comparator 92 produces an output "0". Therefore, the output of the OR gate 94 goes to a "0" when all the bits of the phase counter 31 except for the least significant bit become "0", that is, when the burst signal ends with the number of clocks being smaller than in the above case by one. In this way, the maximum error of the end phase becomes a phase corresponding to one-half the set value i.

Figure 6:
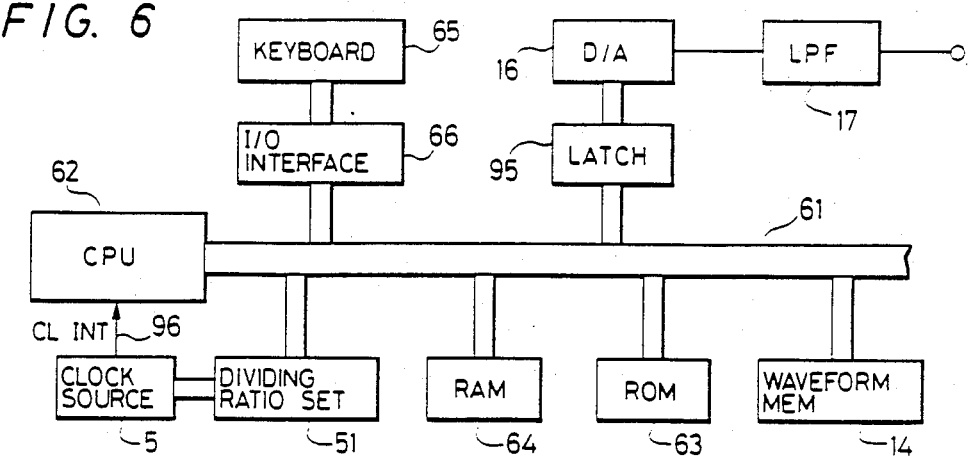
FIG. 6 is a block diagram illustrating another embodiment of the present invention which performs the counting of the number of waves and the determination of the end phase by a microcomputer.

It is also possible to perform, by the use of a microcomputer, the functions of the wave-number detecting means 2, the end phase detecting means 3 and the signal generation suspending means 4 in FIG. 1A, as shown in FIG. 6, in which the parts corresponding to those in FIG. 1A are identified by the same reference numerals. It is natural, however, that the contents of a program stored in the ROM 63 differ from those in the case of FIG. 1A. In this example, a latch circuit 95 is connected to the data bus 61, and waveform data latched in the latch circuit 95 is converted by the D/A converter 16 into an analog signal. The waveform memory 14 is connected to the data bus 61. The clock signal from the clock signal source 5 is applied to the CPU 62 as an interrupt signal CL INT via an interrupt line 96.

Figure 8:
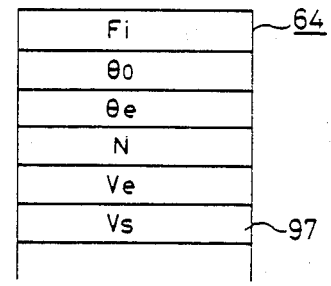
FIG. 8 is a diagram partly showing the stored contents of the RAM 64 in FIG. 6.
Figure 7:
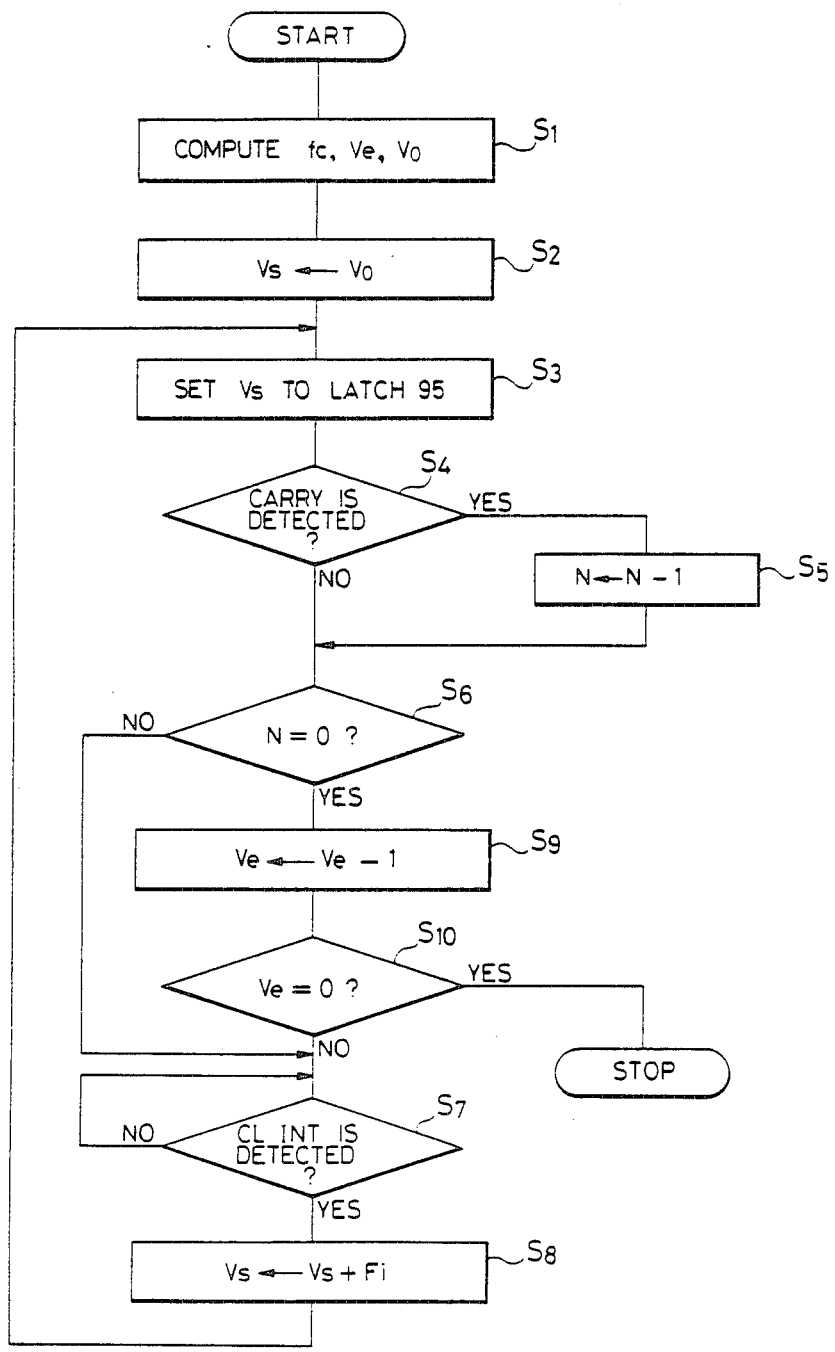
FIG. 7 is a flowchart showing an example of the operation of the embodiment of FIG. 6.

In this case, the CPU 62 reads out, interprets and executes the program, performing such an operation, for example, as shown in FIG. 7. In step $S_1$, the clock frequency $f_c$, the value $V_\theta$ corresponding to the set end phase $\theta_e$ and the start phase value $V_0$ corresponding to the set start phase $\theta_0$ are computed, as is the case with FIG. 3. These computed values are stored in the RAM 64, along with various set values from the keyboard 65, as shown in FIG. 8. The RAM 64 has an added value area 97 corresponding to the latch circuit 13 in FIG. 5. In step $S_2$, the computed start phase value $V_0$ is set in the added value area 97 of the RAM 64. In step $S_3$, the added value $V_s$ in the added value area 97 is latched in the latch circuit 95. In step $S_4$, it is checked whether a carry was produced from the nth bit by an addition of the frequency set value $F_i$ and the added value $V_s$. In the case where a carry was generated, the number of waves, N, first set in the RAM 64 is decremented by one in step $S_5$, and the process goes to step $S_6$. In the absence of a carry in step $S_4$, the process immediately proceeds to step $S_6$, wherein it is checked whether the set number of waves have been counted, that is, whether N=0. If not, the operation proceeds to step $S_7$, wherein it is checked whether an interrupt has been caused by the clock interrupt signal CL INT from the clock signal source 5. If so, the set frequency $F_i$ and the accumulated value in the added value area 97 are added and the result of the addition is loaded into the added value area 97 in step $S_8$, after which the operation goes back to step $S_3$. When it is detected in step $S_6$ that N=0, that is, when it is detected that the wave-number counting operation has been finished, the process proceeds to step $S_9$, wherein the end phase value $V_e$ in the RAM 64 is decremented by one and then loaded again into the original area of the RAM 64. In step $S_{10}$, it is checked whether the decremented end phase value $V_3$ has become zero, that is, whether the set end phase has been reached. If $V_e$ is not zero, the operation goes back to step $S_7$, and if $V_e$ is zero, then the operation ends.

In the above, it is also possible to employ such an arrangement that the address of the waveform memory 14 advances one by one every plurality clock signals.

In the preferred embodiments of the present invention described above, since their arrangements take advantage of an overflow, or a carry, produced from the nth bit of the adder 12 when the adder 12 has counted $2^n$, there are sequentially stored in the waveform memory 14 at its $2^n$ addresses amplitude data at the positions of $2^n$ phases into which the waveform of one cycle has been divided. Accordingly, the readout address for the waveform memory 14 can be stepped at arbitrary equi-phase intervals regardless of whether an integral multiple of the phase intervals is equal to one cycle (360°) or not.

Figure 9:
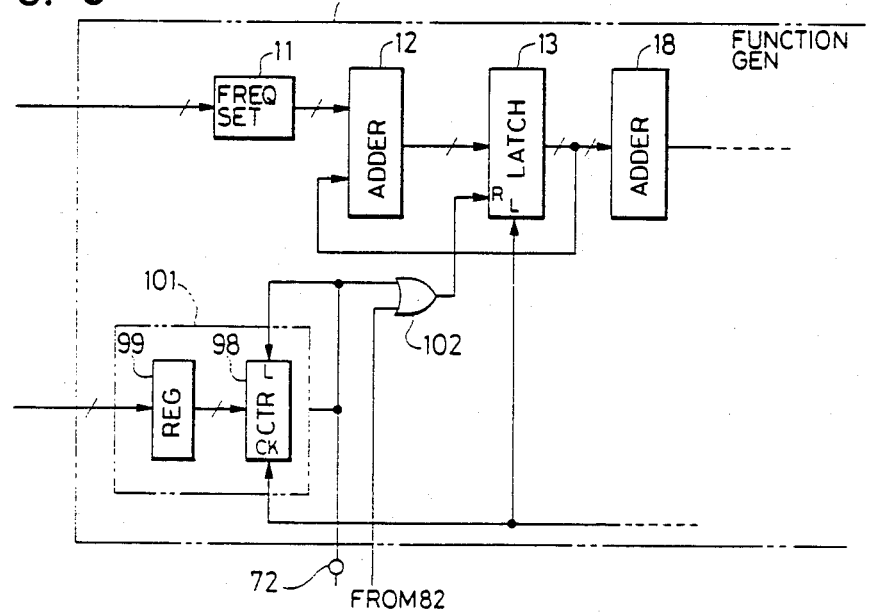
FIG. 9 is a block diagram showing a part of a modified form of phase accumulating type function generating means 1 in FIG. 1A.

By modifying the phase accumulating type function generating means 1, as partly shown in FIG. 9, however, it is also possible to arrange such that one cycle (360°) is divided into a desired integer K, other than $2^n$, amplitude data at the corresponding K phase positions are stored in K address areas of the waveform memory 14, and the readout address for the waveform memory 14 is advanced step by step at fixed intervals m which satisfy the condition N=l×m (where l and m are positive integers). That is, the function generating means 1 shown in FIGS. 1A, 4 and 5 is further provided with an access-number detecting means 101 which is formed by a presettable access-number counter 98 and an access-number setting register 99 in the same manner as in the case of the wave-number counting means 2, as illustrated in FIG. 9. In the counter 98 is set the number of accesses, l, set in the register 99, and the counter 98 counts down from the value l upon each application of the clock signal to the latch circuit 13. When the waveform data of one cycle is read out of the waveform memory 14 and the content of the counter 98 reaches zero, a "1" is provided to the output of the access-number detecting means 101. The output "1" is applied via an OR gate 102 to the latch circuit 13 to reset it, and at the same time, the value l is set again in the counter 98 from the register 99 and the output "1" is also provided via the terminal 72 to the wave-number counter 21. In the frequency setting register 11 is set the value m from the controller 6, and the set value m and the content of the latch circuit 13 are added by the adder 12. Accordingly, each time the adder 12 cumulatively adds the value m l times, the phase of the waveform read out of the waveform memory 14 returns to its start phase.

As has been described in the foregoing, the present invention permits the generation of a burst signal having a preset number of waves. Further, the burst signal can be started with a preset start phase and stopped with a preset end phase. Especially, by counting the number of waves through using carry signals resulting from an accumulation, it is possible to obtain a burst signal whose number of waves exactly coincides with a preset number of waves.

It will be apparent that many modifications and variations may be effected without departing from the scope of the novel concepts of the present invention.

What is claimed is:

1. A burst signal generator, comprising:
   a waveform memory having stored therein one cycle of a waveform at fixed phase intervals;
   frequency setting means for setting therein a frequency value corresponding to a frequency of a burst signal to be generated;
   a clock signal source for generating a clock signal;
   accumulating means for accumulating the frequency value set in the frequency setting means upon each occurrence of the clock signal from the clock signal source to produce an accumulated value;
   wave-number setting means for setting therein a number of cycles of the burst signal to be generated;
   start phase setting means for setting therein a phase start value corresponding to a start phase of the burst signal;
   start phase adding means, connected to said waveform memory, for adding the phase start value from said start phase setting means and the accumulated value from said accumulating means to provide an added value as an address for readout of said waveform memory;
   a D/A converter, connected to said waveform memory, for converting the waveform data read out of the waveform memory into an analog signal;
   wave-number detecting means for counting a number of cycles of the waveform read out of the waveform memory and producing a count value and for generating a wave-number count end signal when the count value reaches a predetermined number;
   end phase setting means for setting therein an end value corresponding to an end phase of the burst signal to be stopped thereat; and
   end phase detecting means, connected to the clock signal source, for counting the clock signal a number of times corresponding to the end value, generating a phase count end signal and stopping generation of the burst signal in dependence upon the phase count end signal after generation of the wave-number count signal.

2. A burst signal generator according to claim 1, wherein said accumulating means comprises:
   a cumulative adder, connected to said frequency setting means, for adding the frequency value from said frequency setting means and a preceding output of said accumulating means and producing a result; and
   a latch circuit, connected to said cumulative adder, for latching therein the result of the addition at each occurrence of the clock signal and outputting the result as the output of the accumulating means.

3. A burst signal generator according to claim 2, further comprising:
   a gate circuit connected to the clock signal source for passing therethrough the clock signals;
   wherein the wave-number detecting means comprises a wave-number counter for counting the number of cycles, and wherein said end phase detecting means comprises a phase counter, connected to said gate circuit, for counting the clock signals from said gate circuit; and
   wherein the gate circuit is closed by the phase count end signal generated after the occurrence of the wave-number count end signal and stops the generation of the burst signal.

4. A burst signal generator according to claim 3, further comprising gate means inserted between said gate circuit and said phase counter, wherein the wave-number count end signal from the wave-number detecting means opens the gate means to pass therethrough the clock signals.

5. A burst signal generator according to claim 3, comprising:
   said wave-number detecting means including a wave-number setting means for setting therein said predetermined number of waves;
   the wave-number counter and the phase counter each being a respective presettable counter; and
   means for presetting, at the start of generation of the burst signal, the contents of the wave-number setting means and the end phase setting means in the wave-number counter and the phase counter, respectively;
   wherein, upon detecting that all bits of the wave-number counter have assumed the same value, the wave-number detecting means outputs the wave-number count end signal, and, upon detecting that all bits of the phase counter have assumed the same value, the end phase detecting means outputs the phase count end signal.

6. A burst signal generator according to claim 5, wherein:
   the phase counter counts the clock signals during the generation of the burst signal and is preset upon each counting of the wave-number counter; and
   means for providing a signal for closing the gate circuit upon occurrence of the phase count end signal after the occurrence of the wave-number count end signal.

7. A burst signal generator according to claim 3, further comprising selector means for selectively supplying the result of the cumulative adder and the start value from the start phase setting means to the latch circuit.

8. A burst signal generator according to claim 3, further comprising adding means for adding the start value and the result from said latch circuit to provide an added value as a readout address for the waveform memory.

9. A burst signal generator according to claim 7 or 8, wherein said wave-number detecting means including wave-number setting means for setting therein said predetermined number of cycles, said said generator further comprising control means for setting the start value, the frequency value, the predetermined number of cycles and the end value into the start phase setting means, the frequency setting means, the wave-number setting means and the end phase setting means, respectively.

10. A burst signal generator according to claim 9, wherein the control means generates a reset/preset command for resetting the latch circuit and for presetting the contents of the wave-number setting means and the end phase setting means into the wave-number counter and the phase counter, respectively, and then a latch command for the latch circuit to perform an initial latch operation, before the clock signals are applied to the latch circuit.

11. A burst signal generator according to claim 10, comprising signal generating means for generating a reset/preset signal and a latch signal in response to the reset/preset command and the latch command from the control means, and for applying the reset/preset signal to the latch circuit, the wave-number counter and the phase counter, and subsequently the latch signal to the latch circuit.

12. A burst signal generator according to claim 9, wherein the clock signal source including an oscillator for generating a reference clock, a variable frequency divider for frequency dividing the reference clock to output the clock signal, and a frequency dividing ratio setting register for setting therein a frequency dividing ratio, wherein the frequency dividing ratio of the variable frequency divider is determined by the frequency dividing ratio set in the frequency dividing ratio setting register, and the frequency dividing ratio of the frequency dividing ratio setting register is set by the control means.

13. A burst signal generator according to any one of claims 1, 2, 3, 4, 5, 6, 7 or 8 wherein:
the accumulating means yields a carry signal each time its accumulated value exceeds the number of waveform data in the waveform memory; and
said carry signals are counted by the wave-number detecting means.

14. A burst signal generator according to any one of claims 3, 4, 5, 6, 7 or 8 further comprising:
comparator means for comparing one-half the frequency value set in the frequency setting means with the result from the cumulative adder;
wherein, when the comparator indicates the result of the cumulative adder is greater than one-half the frequency value set in the frequency setting means, the phase counter is caused to output the phase count end signal when its count value becomes smaller than a preset phase value by one.

15. A burst signal generator according to any one of claims 1, 2, 3, 4, 5, 6, 7 or 8, further comprising:
access-number detecting means including access-number setting means for setting therein a number of accesses in which said waveform data of the waveform memory is to be read out, and an access-number counter for counting the clock signals;
wherein the access-number detecting means generates a one cycle end signal each time the access-number counter counts the clock signals a number of times equal to the content of the access-number setting means, and the generated one cycle end signal is applied to the wave-number detecting means for said counting of said wave-number detecting means.

16. A burst signal generator according to claim 1 further comprising:
control means including a CPU, a RAM, a ROM and the waveform memory connected to one another via a bus;
said RAM having predetermined first, second and third address areas which comprise said frequency setting means, wave-number setting means and end phase setting means, respectively, and a fourth address area for storing the accumulated value from said accumulating means; and
the CPU being operative in accordance with a program stored in the ROM:
to add the frequency value in the first address area and content of the fourth address area of the RAM to produce an added result and to store the added result as a new accumulated value in the fourth address area upon each detection of the clock signal, thereby to implement the accumulating means;
to decide if a carry is produced from a predetermined bit position in the addition performed by the accumulating means, and if so, to change the content of the second address area by one, and to decide if the content of the second address area becomes a predetermined value and, if so, to generate the wave-number count end signal, thereby to implement the wave-number detecting means; and
to change the content of the third address area by one upon detection of the wave-number end signal, and to decide if the content of the third address area becomes a predetermined value and, if so, to generate the phase count end signal, thereby to implement the end phase detecting means.

* * * * *

UNITED STATES PATENT AND TRADEMARK OFFICE
CERTIFICATE OF CORRECTION

PATENT NO. : 4,713,788

DATED : December 15, 1987

INVENTOR(S) : Toshiharu Kasahara et al

It is certified that error appears in the above-identified patent and that said Letters Patent is hereby corrected as shown below:

Col. 6, line 39, after "frequency" (1st occurrence), delete --increment--, and

Col. 6, after "frequency" (2nd occurrence), insert --increment--

Col. 6, line 49, "be" s/b --by--.

Col. 12, line 23, "$V_3$" s/b --$V_c$--;

Signed and Sealed this

Twelfth Day of July, 1988

Attest:

Attesting Officer

DONALD J. QUIGG

Commissioner of Patents and Trademarks